United States Patent

Lutteke et al.

[11] Patent Number: 5,961,189
[45] Date of Patent: Oct. 5, 1999

[54] BRAKE SYSTEM FOR AUTOMOTIVE VEHICLES WITH PNEUMATIC BRAKE POWER BOOSTER

[75] Inventors: Harald Lutteke, Rosbach; Peter Bohm, Friedrichsdorf; Peter Drott, Frankfurt am Main; Hans-Jorg Feigel, Rosbach; Manfred Kahrs, Wiesbaden; Peter Rieth, Eltville, all of Germany

[73] Assignee: Continental Teves AG & Co., oHG, Frankfurt, Germany

[21] Appl. No.: 08/737,751

[22] PCT Filed: May 15, 1995

[86] PCT No.: PCT/EP95/01828

§ 371 Date: Nov. 11, 1996

§ 102(e) Date: Nov. 11, 1996

[87] PCT Pub. No.: WO95/31362

PCT Pub. Date: Nov. 23, 1995

[30] Foreign Application Priority Data

May 16, 1994 [DE] Germany ............... 44 16 833

[51] Int. Cl.⁶ ............ B60T 13/52; B60T 13/44; B60T 17/02
[52] U.S. Cl. .............. 303/114.3; 188/355; 188/356; 303/10; 303/11; 303/12; 303/119.1; 303/DIG. 3; 60/412
[58] Field of Search ............ 188/356, 357, 188/355; 303/119.1, 114.3, 113.4, 113.3, 10–12, 116.4, DIG. 3, DIG. 4, 115.1, 115.3; 91/6, 376 R, 391 R, 433, 460; 60/547.1, 428, 370, 545, 407–412, 415, 404; 417/223, 12, 15, 17, 44.2, 36, 44.1, 44.3, 45

[56] References Cited

U.S. PATENT DOCUMENTS 3,756,666  9/1973  Leiber .................... 303/116.4
3,901,342  8/1975  Nunn, Jr. ................ 188/356
3,950,946  4/1976  Sakai et al. .
4,291,612  9/1981  Day .
4,497,618  2/1985  Anderson et al. ........... 418/88
4,738,112  4/1988  Nomura et al. ............. 303/12
4,932,727  6/1990  Wagner et al. ............ 60/547.1
5,658,131  8/1997  Aoki et al. ................ 417/17

FOREIGN PATENT DOCUMENTS

2505880A1  8/1976  Germany .
2716471A1  10/1978  Germany .
3203400A1  8/1983  Germany .
3322176A1  1/1985  Germany .
3739913A1  6/1989  Germany .
3842459A1  7/1989  Germany .
3906529A1  9/1990  Germany .
3912938A1  10/1990  Germany .
4123637A1  1/1993  Germany .
59-156855  9/1984  Japan ..................... 303/12
1145257  6/1989  Japan ................... 60/547.1
4300766  10/1992  Japan .................... 303/114.3

OTHER PUBLICATIONS

Official English Language Translation of the International Examination Report for Application No. PCT/EP95/01828.
PCT Search Report—Application No. PCT/EP95/01828.
German Search Report—Application No. P4416833.0.

*Primary Examiner*—Douglas C. Butler
*Attorney, Agent, or Firm*—Rader, Fishman & Grauer PLLC

[57] ABSTRACT

A brake system for automotive vehicles has a pneumatic brake power booster with two chambers one of the chambers being adapted to be acted upon by a low pressure and the other one by a higher pressure, and at least one of the chambers being adapted to be connected to a pneumatic pump. A device is provided to activate and deactivate the pump in response to the pressure that prevails in the chamber of the brake power booster associated with the pump.

14 Claims, 9 Drawing Sheets

BRAKE SYSTEM FOR AUTOMOTIVE VEHICLES WITH PNEUMATIC BRAKE POWER BOOSTER

FIELD OF THE INVENTION

The present invention relates to brake systems for automotive vehicles with a pneumatic brake power booster including two chambers, one of the chambers being adapted to be acted upon by a low pressure and the other one by a higher pressure, and at least one of the chambers being adapted to be connected to a pneumatic pump.

BACKGROUND OF THE INVENTION

German patent No. 27 16 471 discloses a brake system of this type wherein a compressed air pump can be connected to a high pressure chamber of a brake power booster by way of an electrically operable solenoid valve. The pressure in the high pressure chamber is adjusted by way of a pulsed electric actuation of the solenoid valve. A low pressure chamber is directly connected to a vacuum pump.

A disadvantage of this known brake system is the use of a solenoid valve which is complicated and costly and requires an electric or electronic controlling or regulating unit for the actuation. The compressed air pump as well as the vacuum pump are pumps with uninterrupted operation which permanently develop the maximum possible excess pressure or vacuum. The result is a high energy consumption because the full pump rate must be provided in each operating condition of the brake system.

Therefore, an object of the present invention is to overcome the above-mentioned shortcomings, i.e., to suggest an inexpensive, energy-saving and simple generic brake system.

SUMMARY OF THE INVENTION

It is particularly appropriate to activate and deactivate the pump in response to the pressure prevailing in the chamber associated with the pump. In this case, the pump is operated demand-responsively, i.e., when the pressure level in the chamber is below a necessary minimum or in excess of a maximum value. It is thereby ensured that the required pressure level is always available. Further, this arrangement permits an energy saving operation of the pump because the pump is actually activated only in the case of need.

A particularly simple activation and deactivation of the pump is possible when it is driven by an electric motor. The operating means may be electric pressure switches, especially switches responding to vacuum which initiate or interrupt the current supply of the electric motor as a function of the pressure prevailing in the associated chamber. Further, it is advantageous that electric motors are low-cost standard component parts which can be easily connected and operated independently of other aggregates. Expediently, the pressure switches have a hysteresis which prevents a continuous activation and deactivation of the electric motor proximate the pressure level required for switching operations.

Another possibility of activating or deactivating the pump as a function of the pressure prevailing in the associated chamber includes mounting a sensor to sense the power input of the electric motor in the current supply of the motor and controlling the pump in response to the output signal of the sensor. For example, a current sensor may be provided having a variable signal which corresponds to a varying power input of the pump when a constant voltage is applied to the electric motor. The pump can be deactivated at a determined value of the power input and can be re-activated after a defined interval, for example. Thus, there is no need for electric pressure switches.

When the pump is configured as an excess pressure pump, its suction side can be connected to a low pressure chamber by way of a valve assembly operable by the pressure prevailing in this chamber. The pressure side of the pump supplies air directly into the high pressure chamber. It is thereby rendered possible that the pump aspirates air from the low pressure chamber as long as permitted by the pressure prevailing in this chamber. Subsequently, the valve assembly can switch over to a second switch position in which a circulation supply may be provided, for example. However, it is easier to achieve that the suction side of the pump is connected to the atmosphere in the second switch position of the valve assembly, which corresponds to an idle position. Admittedly, the pump has a lower power input in both cases because a higher pilot pressure exists on the suction side. However, it is another advantage of the connection to the atmosphere that additional air volume may enter into the system. The result is that the pressure level required in the high pressure chamber can be reached more quickly and the pump may be deactivated at an earlier time. Further, a possible loss of pneumatic medium may be compensated for by the aspiration from the atmosphere.

Also disclosed is a vacuum/excess pressure pump connected to the two chambers of the brake power booster which can be operated pneumatically and electrically in an expedient manner. Two electrically parallel connected pressure switches are provided which are operated by the pressure in each one of the two chambers and provide the electric motor with current as long as the pressure prevailing in the high pressure chamber is too low or the pressure prevailing in the low pressure chamber is too high. In addition, the respective chambers can be uncoupled from the suction side or the pressure side of the pump by way of a valve assembly associated with the chambers and operable pneumatically in response to the pressure which prevails in the chambers. The pump can be correspondingly connected to the atmosphere at these points. This causes a partial idle position because in this case the pump must deliver on one side only (on the suction side or the pressure side) and, on the other hand, supplies air to, or aspirates air from the atmosphere. This arrangement achieves a reduced energy consumption.

A pressure accumulator may be connected to the pneumatic chamber. This is especially appropriate when an excess pressure pump is used because the produced excess pressure can then be stored in the pressure accumulator and taken when required. In this case, it is possible to use a conventional vacuum brake power booster which requires only slight modifications. The pressure accumulator is connected at the point of the conventional atmosphere connection, and the low pressure chamber, which is normally evacuated, can be connected to the atmosphere as well as to the suction side of the pump.

In general, the brake power booster itself is used as a vacuum accumulator. If the pneumatic brake power booster is used as an excess pressure accumulator, it must have its structure adapted to suit this function. Any conventional brake power booster can be used as an excess pressure accumulator with minor modifications.

Condensation water in the valve assembly can be removed by the arrangement of an air dryer on the pressure side of the pump. Arranging the air dryer on the suction side provides an additional protection of the pump against condensation water.

The valve assembly (or the valve assemblies) can also be integrated into the pneumatic brake power booster. The valve assembly can be arranged completely or partially within the brake power booster housing. For example, indentations may be provided in the outer panel of the brake power booster to accommodate the valve assembly. This would necessitate only a minor modification to a conventional standard brake power booster. However, the valve assembly may also be slipped into an opening in the booster housing in which normally the vacuum port is arranged. The pump can be integrated into the brake power booster in a similar manner.

In a preferred aspect of the present invention, the pneumatic pressure accumulator may be integrated in the housing of the brake power booster. Dead spaces, which are not used during operation, exist especially in the low pressure chamber. The excess pressure accumulator can be integrated in the dead space.

An excess pressure accumulator may either be arranged entirely in the housing of the brake power booster or from the outside in indentations of the housing. The advantages are identical to those described hereinabove.

When the pump is driven by a motor operating a hydraulic pump of a slip-controlled brakes system (ABS or ABS/TCS system), there is no need for an additional motor. The above-mentioned motor, which is already provided in the automotive vehicle, will thus be utilized to a greater degree. The pneumatic pump may be coupled directly to the motor of the slip-controlled brake system and may be in connection with the brake power booster by way of pneumatic lines, or the pump may be driven by a flexible shaft, for example, and positioned at a determined distance from the motor. This permits a more flexible use of the available mounting space.

When a freewheeling drive is interposed between the hydraulic pump and the motor of the slip-controlled brake system, as claimed in claim 14, the hydraulic pump (used to supply the slip-controlled brake system with hydraulic medium) can be uncoupled from the motor by simply reversing the direction of rotation of the motor. This saves energy because the operation of the hydraulic pump is less frequent, and reduces the wear of the hydraulic pump, thereby increasing its useful life. In slip controlled braking operations, it is only required to reverse the direction of rotation of the motor, and both the pneumatic and the hydraulic pump will be operated as a result.

A means is provided which activates and deactivates the pump in regular intervals. In this arrangement, the pump may be activated in regular intervals, for example every two to three minutes, for a certain period, for example 30 seconds, and will remain deactivated in the interim. This ensures the constant provision of a sufficient pressure level. Also, the pump may be activated regularly when the brake pedal is applied and, if provided with a hysteresis, may run until 30 seconds after termination of the application of the brake pedal and may be deactivated only in the interim, i.e. when the brake pedal is not applied. An application of the brake pedal can be determined by way of the brake light switch which is closed when the brake pedal is applied. The brake light switch can be a travel sensor or a pressure sensor, for example. This ensures a constant delivery of the pump during a braking operation and, thus, an uninterrupted generation of the required pressure level during the braking operation. In a preferred aspect of the present invention, the pump is operated in regular intervals during application of the brake pedal and also in the interim because a sufficient pressure level is thereby ensured already at the commencement of the application of the brake pedal. The activation and deactivation of the pump may be effected by way of a controllable freewheeling device when the pump is driven by a constantly rotating shaft. However, the pump may also be driven electromotively.

When the pump is regularly activated and deactivated, the need for pneumatic valves, which are susceptible to condensation water, is obviated or reduced.

The advantage of a pneumatic valve assembly which is interposed between the pump and the associated chamber, which is operable by the pressure prevailing in the chamber and establishes a connection between the pump and the chamber in a first switch position and isolates the pump from the chamber in a second switch position, is that the valve assembly does not require being actuated electrically. Thus, the valve assembly is failsafe. The first switch position is adopted as long as the pressure in the chamber has not yet reached the level which is necessary for a proper functioning of the pneumatic brake power booster. As soon as this level is reached, the valve is operated by the pressure prevailing in the chamber, for example, in opposition to a spring preload, and will then adopt the second switch position. The pump is isolated from the chamber in this switch position, i.e. the pump idles without load. The result is a reduced power input of the pump which can be driven by the combustion engine of an automotive vehicle or any electric motor, for example.

When the pump is a vacuum pump, its suction side is advantageously connected to the atmosphere in the second switch position of the valve assembly. The vacuum pump will aspirate air from the low pressure chamber of the brake power booster as long as the pressure prevailing in the chamber does not drop below a defined value. When this value falls short of the defined value, an idling position of the vacuum pump is achieved by aspirating air from the atmosphere.

When the pump is an excess pressure pump, its pressure side is connected to the high pressure chamber of the pneumatic brake power booster in the first switch position and to the atmosphere as soon as the pressure in this chamber exceeds a defined value. Idling of the excess pressure pump along with a low power input is thereby achieved.

It has proved particularly effective to connect the suction side of an excess pressure pump to the low pressure chamber of the pneumatic brake power booster by way of a second valve assembly which is operable by the pressure prevailing in the low pressure chamber. The second valve assembly connects the suction side of the excess pressure pump to the low pressure chamber as long as the pressure in the chamber permits a sufficient delivery rate of the excess pressure pump. When the value which depends on the type of pump and the dimensioning of the pump falls short of, the second valve assembly connects the suction side of the pump to the atmosphere. The advantage is not only that an excess pressure is provided in the high pressure chamber. In addition, a defined vacuum is provided in the low pressure chamber of the brake power booster. The greater difference in pressure between the two chambers resulting therefrom permits a higher boosting ratio.

When the pressure side of the excess pressure pumps in the second switch position of the first valve assembly is not connected to the atmosphere but to the suction side of the excess pressure pump, a cyclic course is achieved which permits introducing only small quantities of air from the atmosphere into the quasi closed system. This is advantageous because only small quantities of moisture may enter into the system. Typically, the ingress of moisture may cause condensation water which affects the function of valves.

To prevent a pressure increase in the low pressure chamber in the condition of cyclic course, i.e., in the second switch position of the first valve assembly, a non-return valve closing in the direction of the second valve assembly is interposed between the suction side of the excess pressure pump and the second valve assembly.

A particularly great difference in pressure between the two chambers of the brake power booster and, thus, a particularly high boosting ratio can be achieved when the pump is configured as a vacuum/excess pressure pump, i.e., as a pump permitting the development of a great vacuum on the suction side and a relatively high excess pressure on the pressure side. A closed system permitting the advantage of a reduced air intake from the atmosphere and, thus, little contamination of the brake system due to air moisture, is achieved by arranging the valve assembly on the pressure side of the vacuum/excess pressure pump and by arranging another valve assembly between the first valve assembly and the suction side of the vacuum/excess pressure pump. Expediently, a non-return valve is interposed between the additional valve assembly and the low pressure chamber that closes towards the latter chamber. The non-return valve prevents a pressure increase in this chamber when the two valve assemblies adopt their cyclic course position. Condensation water is prevented, in particular in the valve assembly or the brake power booster when an air dryer is connected upstream or downstream of the valve assembly. In this arrangement, it is preferred to position the air dryer either upstream of the valve assembly interposed between the pump and the high pressure chamber, or downstream of a valve assembly connecting the suction side of the pump to the atmosphere. A large number of structural elements are thereby protected against atmospheric moisture.

DETAILED DESCRIPTION OF A PREFERRED EMBODIMENT

Figure 1:
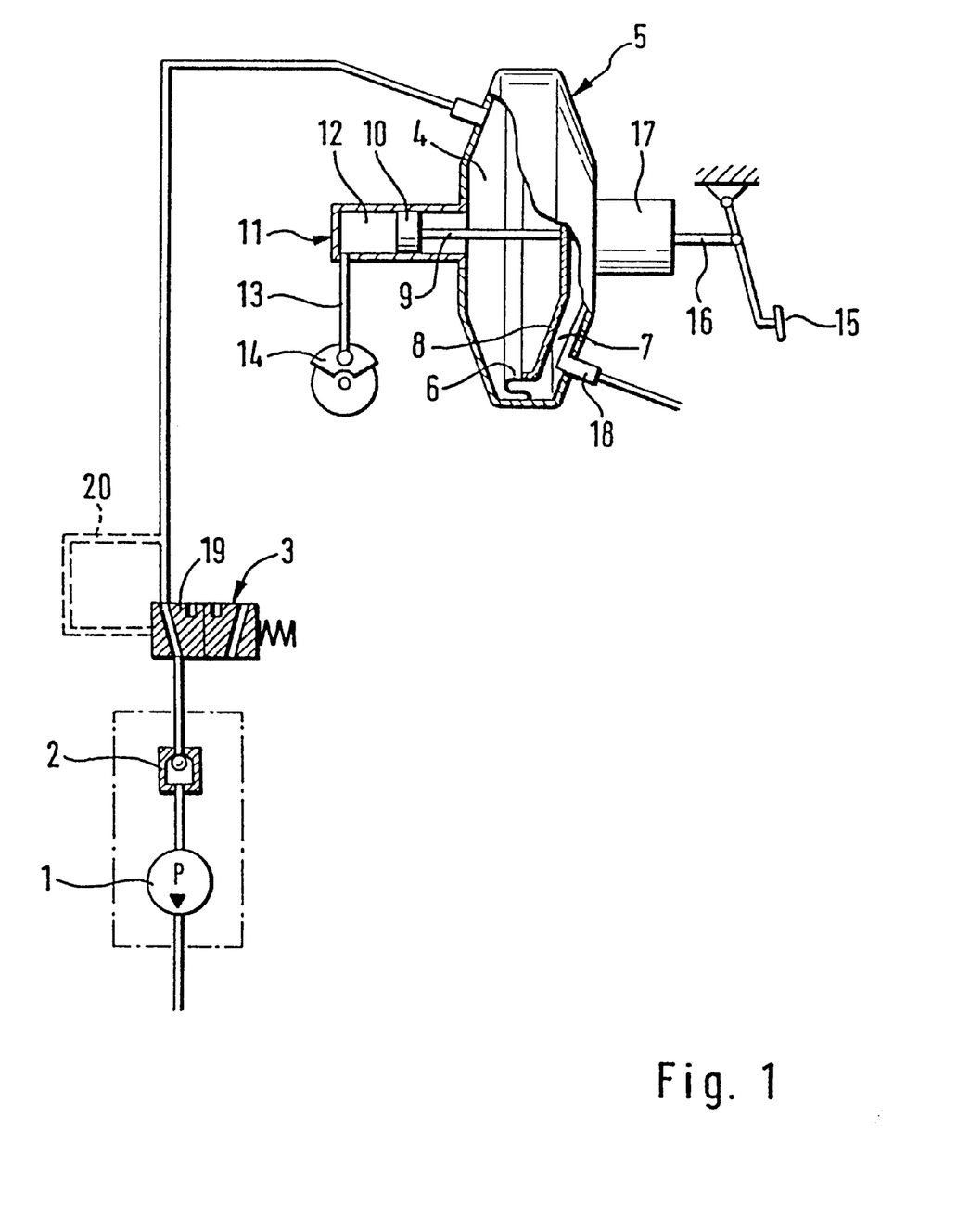
FIG. 1 is a schematic view of the brake system including a vacuum pump according to the present invention.

FIG. 1 shows a brake system including a pneumatic vacuum pump 1 according to the present invention. A non-return valve 2 is arranged on the suction side of the vacuum pump 1. The non-return valve 2 is connected to a low pressure chamber 4 of a brake power booster 5 by way of a valve assembly 3.

The low pressure chamber 4 in the schematically illustrated brake power booster 5 is separated from a high pressure chamber 7 by a diaphragm 6. The diaphragm 6 is connected to a working piston 8 to which a piston rod 9 is attached. A piston 10 is attached to the other end of the piston rod 9. Piston 10 is guided in a master cylinder 11 (shown only schematically) and confines therein a working chamber 12. The working chamber 12 is connected to wheel brakes 14 by hydraulic brake lines 13.

Actuation of the piston rod 9 causes displacement of the piston 10 to the left, as viewed in the drawing, and pressure fluid is conducted from the working chamber 12 to the wheel brakes 14. The result is that the vehicle is braked. A like braking operation is initiated by the application of a brake pedal 15 which is connected to a push rod 16 terminating into the valve housing 17 of the brake power booster 5. A control valve is positioned in a valve housing 17 in a known manner which is not described herein. Upon actuation of the push rod 16, the control valve provides a connection between the high pressure chamber 7 and the atmosphere by way of a pressure port 18. When the push rod 16 is not actuated, the control valve provides a connection between the high pressure chamber 7 and the low pressure chamber 4. A force which is applied to the left by the push rod 16 is thus converted in a known manner into a boosted output force acting on the piston rod 9.

The valve assembly 3 is configured as a pneumatically operable three-way/two-position directional control valve 19 which connects the chamber 4 to the vacuum pump 1 in its first switch position shown. The three-way/two-position directional control valve 19 is acted upon by the pressure prevailing in the low pressure chamber 4 through the control line 20. When the pressure falls below a certain predetermined value, the three-way/two-position directional control valve 19 is shifted to a second switch position in opposition to its preload. In the second switch position, the chamber 4 is isolated from the vacuum pump 1, and the suction side of the vacuum pump 1 is connected to the atmosphere. Thus, the vacuum pump 1 "idles", i.e. has a low power consumption. As soon as the pressure in the chamber 4 exceeds a certain predetermined maximum value, the three-way/two-position directional control valve 19 switches back to its first switch position, and the chamber 4 is evacuated again by way of the vacuum pump 1. To prevent a constant switch-over of the three-way/two-position directional control valve 19, the valve includes an appropriate hysteresis.

Figure 2:
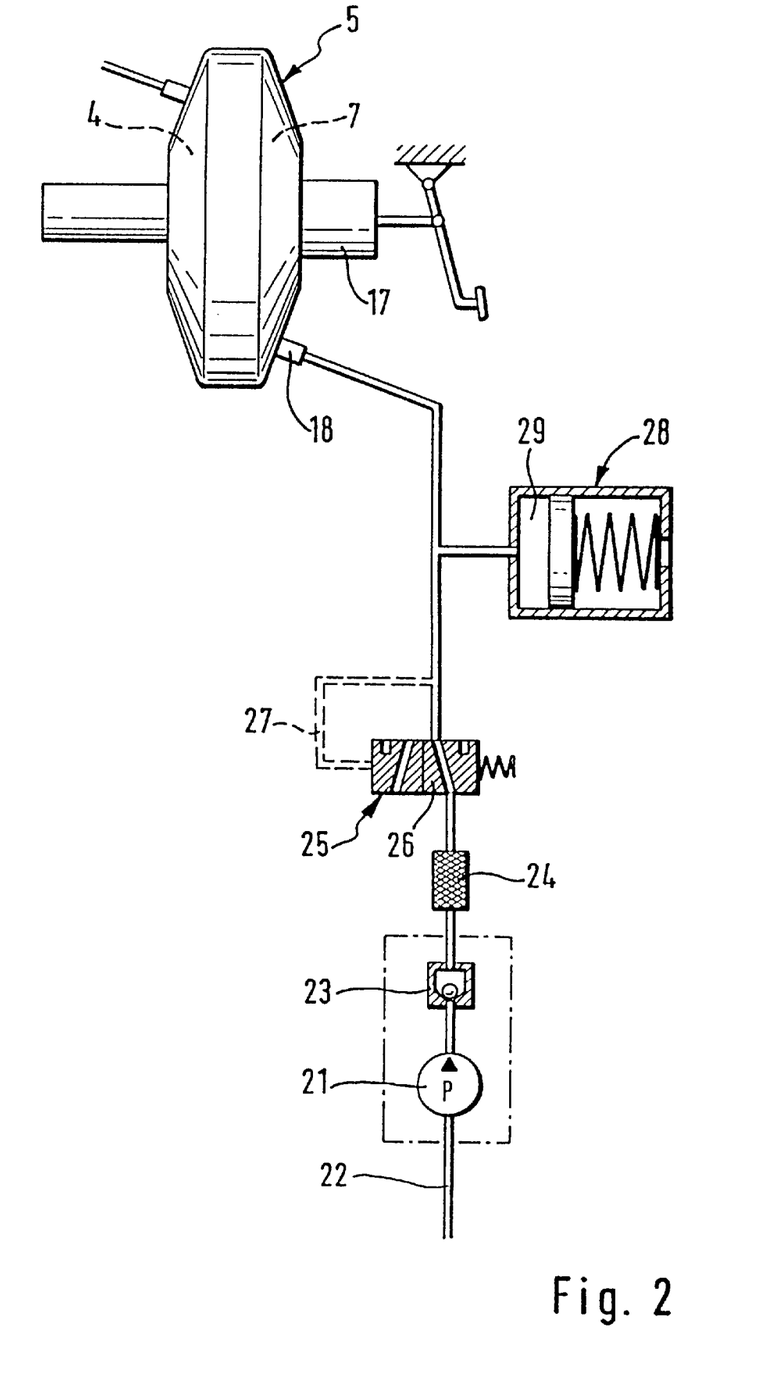
FIG. 2 is a schematic view of the brake system including an excess pressure pump according to the present invention.

FIG. 2 shows a brake system including an excess pressure pump 21 according to the present invention. Like component parts have been assigned like reference numerals as in the embodiment of FIG. 1, and their function will be described only to the extent it differs from the function described with respect to the embodiment of FIG. 1.

The excess pressure pump 21 is connected to the atmosphere by way of a pneumatic line 22 and conducts compressed air to the valve assembly 25 by way of a non-return valve 23 and an air dryer 24.

The valve assembly 25 includes a biased three-way/two-position directional control valve 26 which is pressureresponsively controllable by way of a control line 27. In its first switch position shown, a three-way/two-position directional control valve 26 connects the excess pressure pump 21 to the pressure port 18 leading to the high pressure chamber 7, a pneumatic pressure accumulator 28 and the control line 27. When the pressure prevailing in a pressure chamber 29 and, thus, the pressure available to act upon the high pressure chamber of the brake power booster 5 exceeds a predetermined limit value, the three-way/two-position directional control valve 26, in opposition to the preload, is caused to adopt its second switch position by way of the control line 27. In the second switch position, the brake power booster 5 and the pressure accumulator 28 are isolated from the excess pressure pump 21 having its pressure side connected to the atmosphere in this switch position. It is thereby achieved that the excess pressure pump 21 idles, i.e. has only a low power consumption, when the pressure which prevails in the high pressure chamber 7 of the brake power booster 5 is sufficient.

The brake power booster 5 in FIG. 2 is a modified conventional vacuum brake power booster having its low pressure chamber 4 connected to atmosphere and its high pressure chamber 7 adapted to be acted upon by compressed air from the pressure accumulator 28 by way of the control valve arranged in the valve housing 17, as described with respect to the embodiment of FIG. 1.

The pressure accumulator 28 becomes unnecessary when the excess pressure pump 21 is able to quickly provide a sufficient volume of compressed air, pressurized appropriately, as required for the operation of the brake power booster.

The brake power booster 5 may also be configured as an excess pressure brake power booster having its two chambers 4, 7 filled with compressed air in the normal case and having its low pressure chamber 4 connected to the atmosphere by way of the control valve arranged in the valve housing 17 upon brake application. The resulting difference in pressure between the chamber 4 and 7 dictates the boosting factor.

Figure 3:
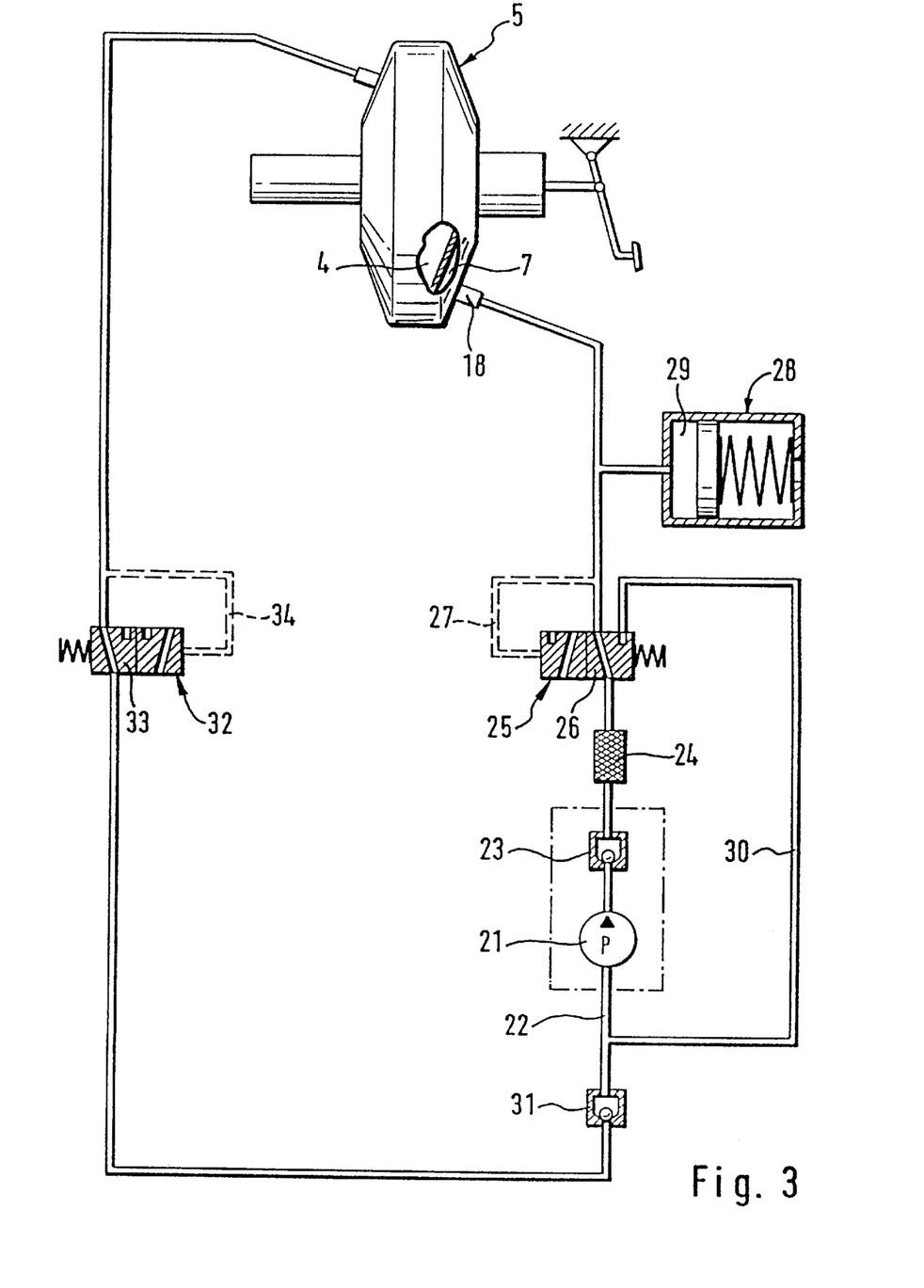
FIG. 3 is a schematic view of the brake system including an excess pressure pump and a closed system according to the present invention.

In FIG. 3, the brake system including an excess pressure pump of FIG. 2 is modified to achieve a closed system. FIG. 3 again assigns like reference numerals to like parts. The three way/two-position directional control valve 26 is connected to the line 22 and, thus, to the suction side of the excess pressure pump 21 by way of a pneumatic line 30. The line 22 is connected to a second valve assembly 32 by way of a non-return valve 31 opening in the direction of the excess pressure pump 21. The second valve assembly 32 includes a pre-loaded three way/two-position directional control valve which is pneumatically operable by way of a control line 34. In its first switch position shown, the three-way/two-position directional control valve 33 connects the non-return valve 31 to the low pressure chamber 4 of the brake power booster 5. In its second switch position, valve 33 connects the non-return valve 31 to the atmosphere and disconnects the chamber 4. The three-way/two position directional control valve 33 will adopt its second switch position when the pressure in the chamber 4 falls short of a defined value and the two-way/two-position directional control valve 33, in opposition to its preload, is shifted to the second switch position by way of the control line 34.

The brake system shown in FIG. 3 is a closed system with respect to the supply of compressed air and vacuum to the brake power booster 5. The excess pressure pump 21 supplies compressed air either into the vacuum brake power booster 5 or the pressure accumulator 28, or back to its suction side when a predetermined pressure is reached. Thus, the suction side of the excess pressure pump 21 is either connected to the pressure side of the pump or to the valve assembly 32 by way of the non-return valve 31. Valve assembly 32, in turn, provides a connection either to the low pressure chamber 4 of the brake power booster 5 or to the atmosphere. When the pressure in the chamber 4 falls below a defined limit value, the three-way/two-position directional control valve 33 will switch over to connect the non-return valve 31 to the atmosphere. However, the non-return valve 31 will open only if a pressure below the atmospheric pressure prevails in the line 22. This is only the case if the pressure accumulator 28 or the high pressure chamber 7 is not yet filled completely. Otherwise, the valve assembly 32 connects the excess pressure pump 21 to its suction side by way of line 30, which means that a higher pressure prevails at the non-return valve 31 on the pump side than on the atmosphere side. A largely closed system is thereby achieved, and the air dryer 24 may be dimensioned to be relatively small because only small quantities of moisture may enter the entire system.

Figure 4:
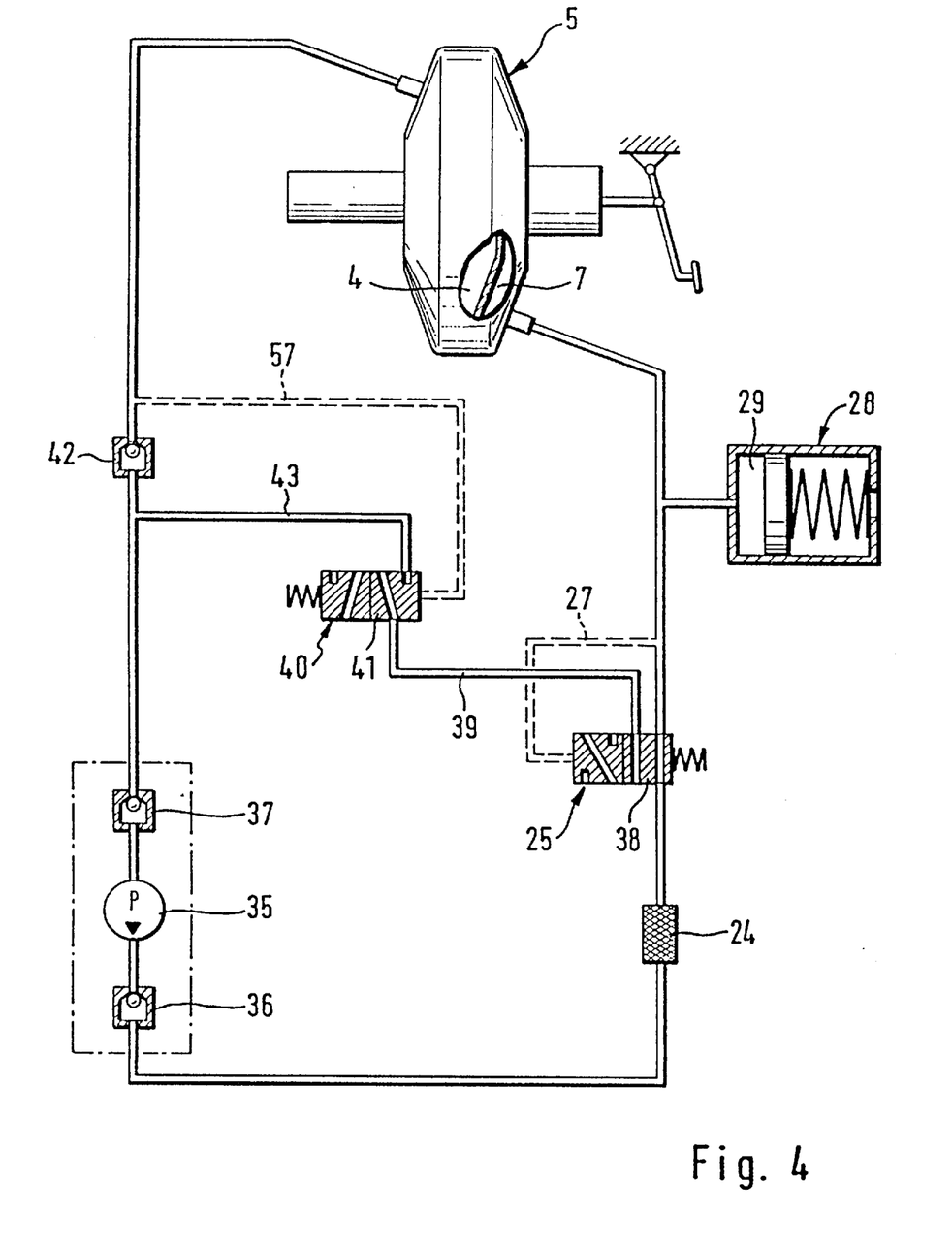
FIG. 4 is a schematic view of the brake system including a vacuum/excess pressure pump according to the present invention.

FIG. 4 shows a brake system including a vacuum/excess pressure pump 35 according to the present invention. This pump is in a position to develop an excess pressure on the pressure side and a vacuum (pressure reduction to roughly 20% of atmospheric pressure is possible) on the suction side. Non-return valves 36, 37 are provided on the pressure and the suction sides. In this arrangement, too, an air dryer 24 is interposed between the pressure-side non-return valve 36 and the valve assembly 25. The valve assembly 25 is configured as a pneumatically operable, preloaded four-way/two-position directional control valve 38. In its illustrated first switch position, the four-way/two-position directional control valve 38 connects the vacuum/excess pressure pump 35 to the high pressure chamber 7 of the brake power booster 5 or the pressure chamber 29 of the pressure accumulator 28. The pressure prevailing therein is applied to valve 38 by way of a control line 27. As soon as this pressure exceeds a predetermined value, the four-way/two-position directional control valve 38 adopts its second switch position where chamber 7 and pressure chamber 29 are disconnected from the vacuum/excess pressure pump 35, while pump 35 is connected to another valve assembly 40 by way of a line 39. The valve assembly 40 is connected to the atmosphere in the previously mentioned first switch position of the four-way/two-position directional control valve 38. The valve assembly 40 is a preloaded pneumatically operable three-way/two-position directional control valve 41 which is acted upon by the pressure prevailing in the low pressure chamber 4 by way of a control line 57. The three-way/two-position directional control valve 41 connects the line 39 to the atmosphere in its illustrated first switch position. Valve 41 connects the line 39 to the suction side of the vacuum/excess pressure pump in its second switch position which it adopts when the pressure in the chamber 4 does not reach a defined minimum value. A non-return valve 42 is interposed between a line 43, leading to the three-way/two position directional control valve 41, and the chamber 4 to prevent a pressure increase in the low pressure chamber 4 of the brake power booster 5 in this case.

When the valves 38 and 41 adopt their basic switch positions shown, the low pressure chamber 4 is evacuated by way of the vacuum/excess pressure pump 35, and air is simultaneously supplied into the high pressure chamber 7 or the pressure chamber 29. When the pressure prevailing in the chambers exceeds a defined value, the four-way/two-position directional control valve 38 adopts its second switch position, and the pump delivers into the line 39. As long as the three-way/two-position directional control valve 41 remains in its first switch position, the vacuum/excess pressure pump 35 will deliver into the atmosphere. When the three-way/two-position directional control valve 41 adopts its second switch position (i.e., when the pressure prevailing in chamber 4 falls short of a defined minimum value), the pressure and suction sides of the vacuum/excess pressure pump 35 will be short-circuited, i.e., the pump idles and, consequently, has a relatively low power consumption. When the three-way/two-position directional control valve 41 is in its second switch position, however, the four way/two-position valve 38 adopts its illustrated first switch position, the suction side of the vacuum/excess pressure pump 35 is connected to the atmosphere by way of the four-way/two-position directional control valve 38, and air is conducted into the chamber 7 of the brake power booster 5 or the pressure chamber 29 of the pressure accumulator 28. In this case, the non-return valve 42 prevents the ingress of air into the low pressure chamber 4.

Advantageously, the brake systems shown in FIGS. 1 to 4 use an electromotively driven pump because a self-supporting unit is thereby achieved which is independent of other drive units.

Figure 5:
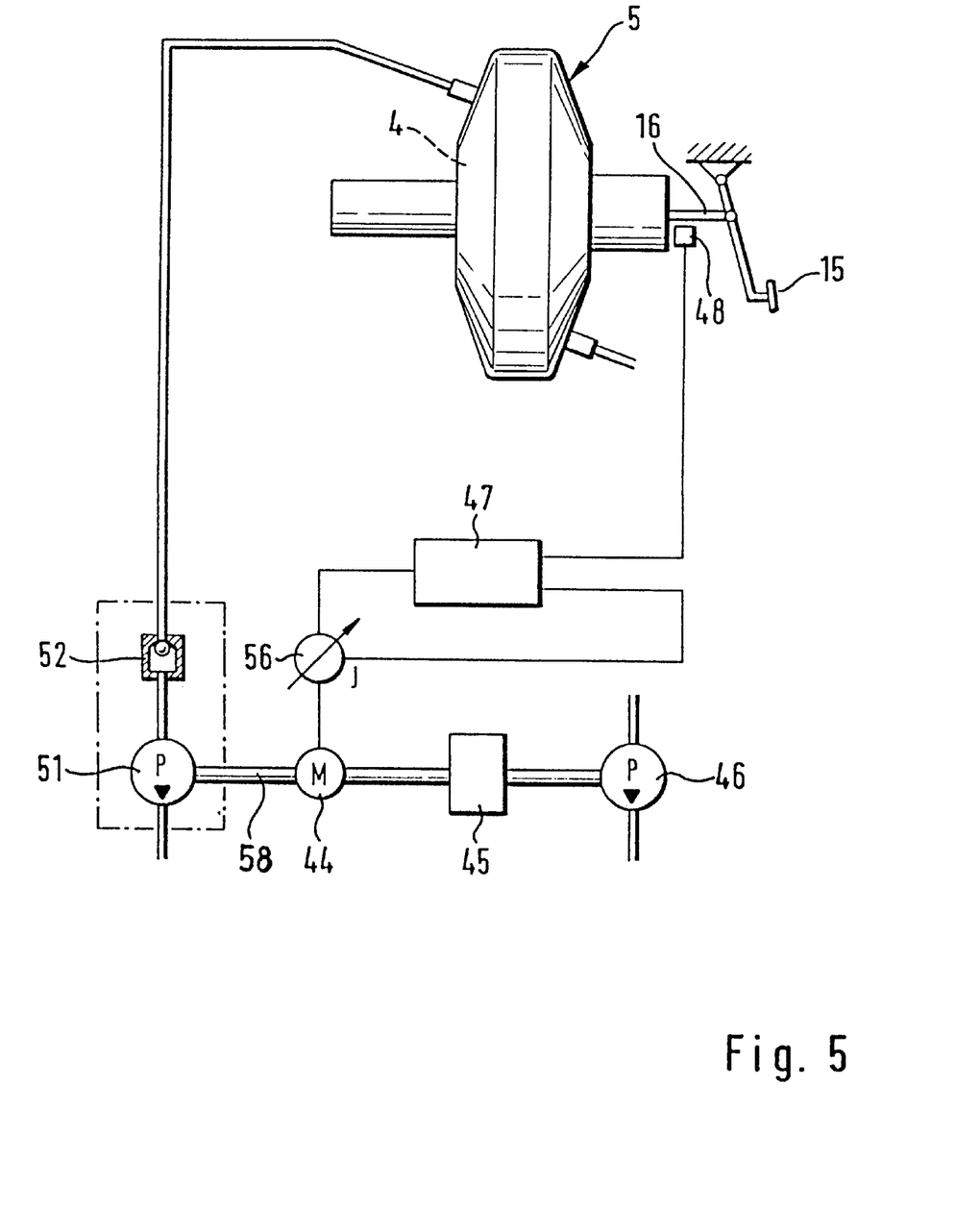
FIG. 5 is a schematic view of the brake system including an electromotively driven vacuum pump according to the present invention.

FIG. 5 shows a brake system including an electromotively driven vacuum pump 51 according to the present invention. The vacuum pump 51 is driven by an electric motor 44 which operates a hydraulic pump 46 of a slip-controlled brake system (ABS or ABS/TCS) by way of a freewheeling drive 45. The electric motor 44 is connected to the control unit 47 of the slip-controlled brake system and is activated and deactivated by it. Also, the control unit 47 is connected to a brake light switch 48 which, in the present embodiment, is provided as a motion sensor recording the movement of the push rod 16. As soon as a movement of the push rod 16 is sensed by way of the brake light switch 48, i.e., as soon as a braking operation is initiated, the electric motor 44 will be energized by way of the control unit 47, and the vacuum pump 51 is started. Pump 51 aspirates air from the low pressure chamber 4 (not shown) of the brake power booster 5 by way of a non-return valve 52 and thus produces the necessary vacuum level. A predetermined hysteresis causes continued movement of the vacuum pump 51 for a certain time after the last movement of the push rod 16 to make available a vacuum as good as possible in the chamber 4 for the next braking operation. Instead of this hysteresis, alternatively a current sensor 56 may be arranged in the current supply of the electric motor 44. The output signal of sensor 56 is conducted to the control unit 47. Control unit 47 will disconnect the current supply when the signal of the current sensor 56 corresponds to a power input of the vacuum pump 51 in accordance with the predetermined pressure level. Corresponding current sensors can be used similarly in excess pressure pumps and vacuum/excess pressure pumps. In addition, the electric motor 44 may be arranged to be activated briefly in specific predetermined intervals, for example every two to three minutes, in order to maintain a value as optimal as possible for the vacuum in the chamber 4. The electric motor 44 operates continuously during braking operations or traction slip control operations to provide the hydraulic pressure necessary for the slip control operation by way of the hydraulic pump 46. Because the brake pedal is generally actuated in such a case, continuous operation of the vacuum pump 51 is also useful in this case.

The vacuum pump 41 and the hydraulic pump 46 are directly driven by the motor shaft 58 which includes corresponding eccentrics at their two ends, for example. The ends project from the housing of the electric motor 44 which is not explicitly shown.

In the case that only one of the two pumps 46 or 51 shall be connected to the electric motor 44, the unused end of the motor shaft 58 is covered by a cap. The electric motor 44 may be used without further modifications, only the unused end of the motor shaft 58, projecting from either end of the housing, is covered by a simple component part. This prevents the possible ingress of dirt, the contact of extraneous parts with the rotating eccentric and permits retrofitting the other pump 51 or 46, if necessary.

The freewheeling drive 45 is optional. If a freewheeling drive 45 is not provided, the vacuum pump 41 and the hydraulic pump 46 always operate at the same time. In general, this does not involve a considerably increased energy consumption because the hydraulic pump 46 idles, i.e. typically runs without power input, in the absence of a slip control mode. However, the activation and deactivation of the electric motor 44 may also be performed by a vacuum switch, such as the switch described with respect to the embodiment of FIG. 6.

If the operation of the hydraulic pump 46 in conjunction with the vacuum pump 51 outside a slip control mode shall be prevented for reasons of noise abatement or for reasons of reduced wear of component parts in the hydraulic pump 46, the freewheeling drive 45 is used to couple the hydraulic pump 46 to the electric motor 44 in one direction of rotation of the motor, while the motor is uncoupled from the hydraulic pump 46 in the opposite direction of rotation of the electric motor 44 (freewheel). The change in direction of rotation can be effected by pole reversal of the terminals of the electric motor 44, for example. This is carried out by a control unit 47 which operates the electric motor 44 in the first direction of rotation in the normal braking case, where it is disconnected from the pump. In the slip control mode, a change in the direction of rotation of the electric motor 44 is initiated by the control unit 47.

Figure 6:
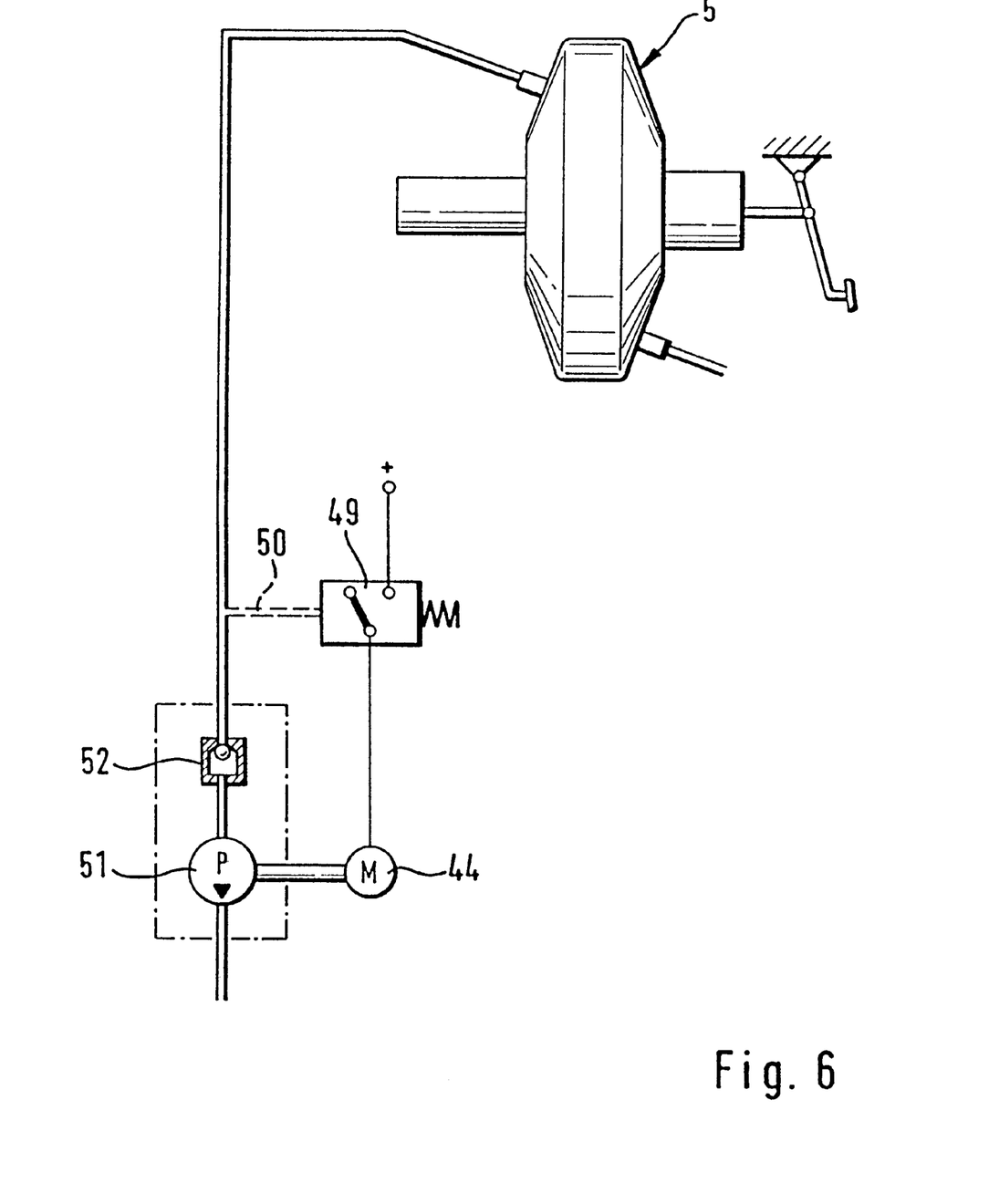
FIG. 6 is a schematic view of another embodiment of the brake system including an electromotively driven vacuum pump according to the present invention.

FIG. 6 shows a brake system including a vacuum pump according to the present invention similar to FIG. 5. This arrangement is not linked to a slip-controlled brake system. The electric motor 44 is activated and deactivated by a pressure switch 49 as a function of the pressure prevailing in the low pressure chamber 4 of the brake power booster 5. The pressure switch 49 is connected to the chamber 4 by way of a control line 50 for this purpose. As soon as the pressure in chamber 4 exceeds a defined value, the electric motor 44 is energized by the pressure switch 49 to operate the pump 51 which evacuates the chamber 4 again. When a sufficient vacuum level is reached, the pressure switch 49 having a hysteresis disconnects the electric motor 44 from the current supply again. In addition, provisions can be made that the electric motor 44 is supplied with current whenever a brake light switch 48 signals a braking operation, as is shown in FIG. 5.

Figure 7:
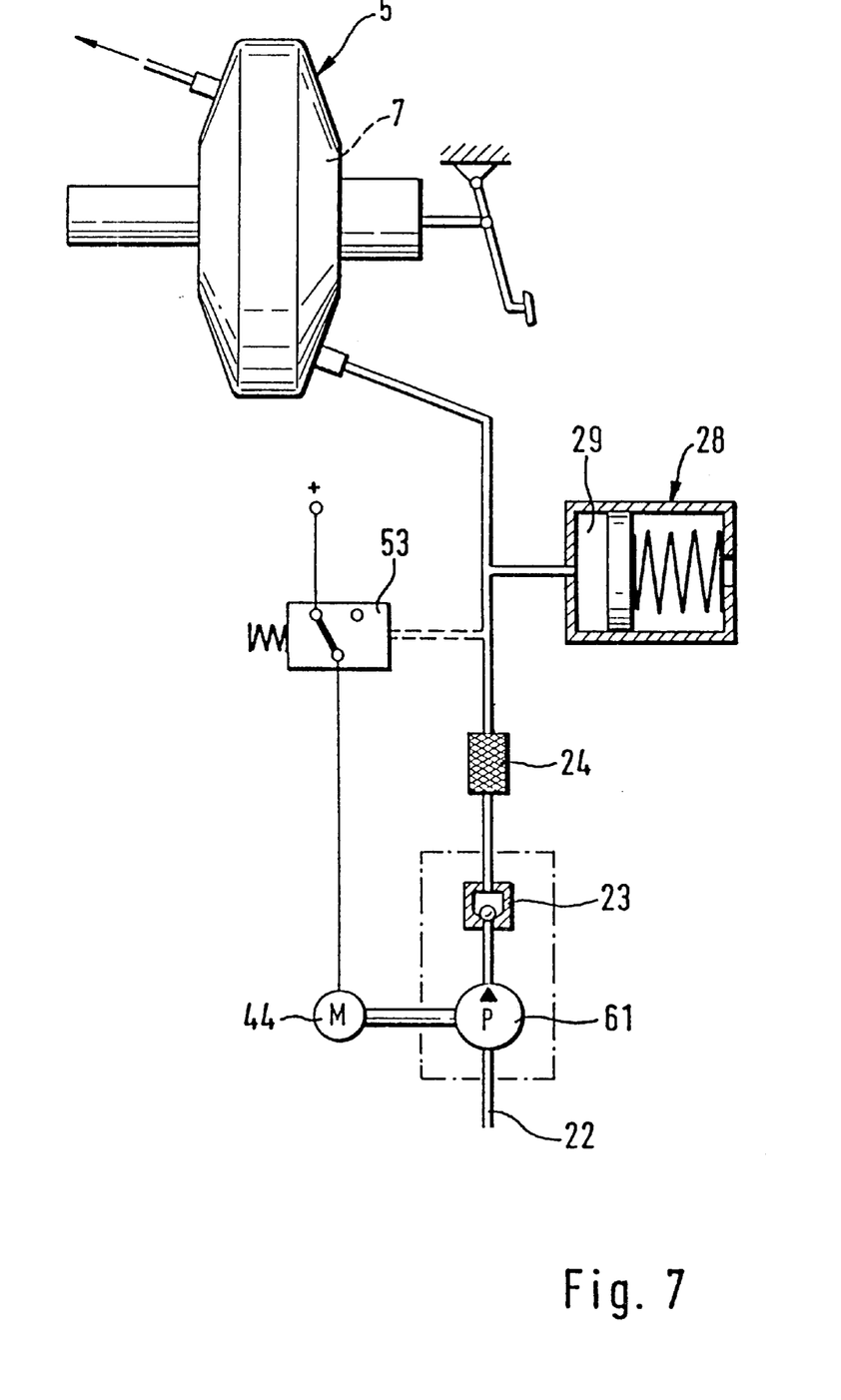
FIG. 7 is a schematic view of the brake system including an electromotively driven excess pressure pump according to the present invention.

FIG. 7 shows a brake system with an electromotively driven excess pressure pump 61 according to the present invention. The excess pressure pump 61 delivers compressed air to the brake power booster 5 or the pressure accumulator 28 by way of a non-return valve 23 and an air dryer 24, as has been described hereinabove. The pressure prevailing in the high pressure chamber 7 of the brake power booster 5 or the pressure chamber 29 actuates a pressure switch 53 which, in excess of a defined pressure value, disconnects the electric a motor 44 from the power supply and connects it with the power supply when a defined pressure value is not reached. The excess pressure pump 61 delivers air from the atmosphere into the brake power booster 5 in this case.

Figure 8:
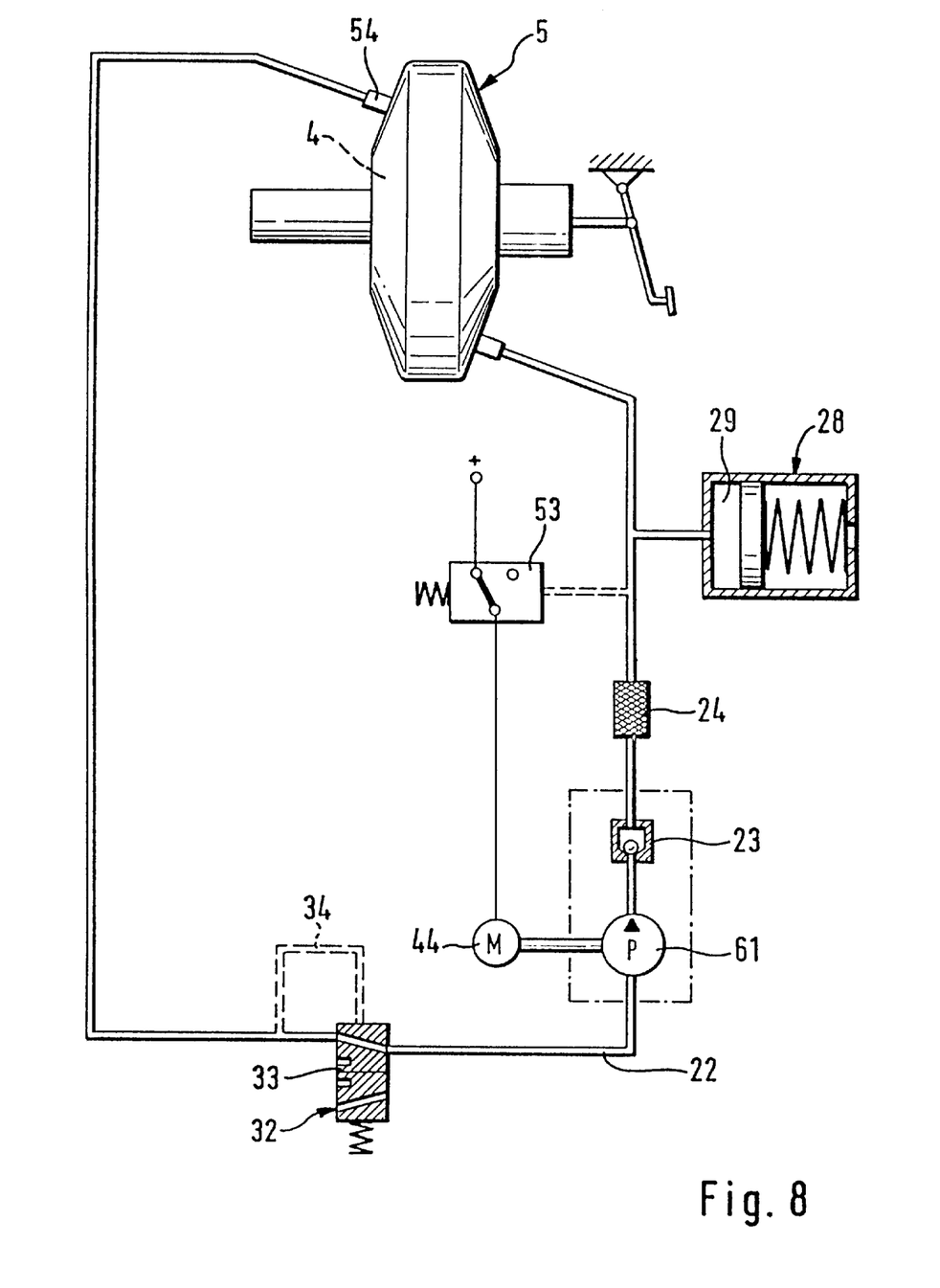
FIG. 8 is a schematic view of the brake system including an electromotively driven excess pressure pump and a closed system according to the present invention.

The arrangement known from FIG. 7 is extended to a closed system in FIG. 8. To this end, the suction side of the excess pressure pump 61 is connected to the vacuum port 54 of the brake power booster 5 and, thus, to its low pressure chamber 4 by way of line 22 and valve assembly 32. The valve assembly 32 includes a preloaded, pneumatically operable three-way/two-position directional control valve which connects the vacuum port 54 to the suction side of the excess pressure pump 61 in its first switch position. In its second switch position, the suction side of the excess pressure pump 61 is connected to the atmosphere. The second switch position of the three-way/two-position directional control valve 33 is controlled by way of the control line 34 after a defined lowest pressure value in the low pressure chamber 4 falls short of.

Figure 9:
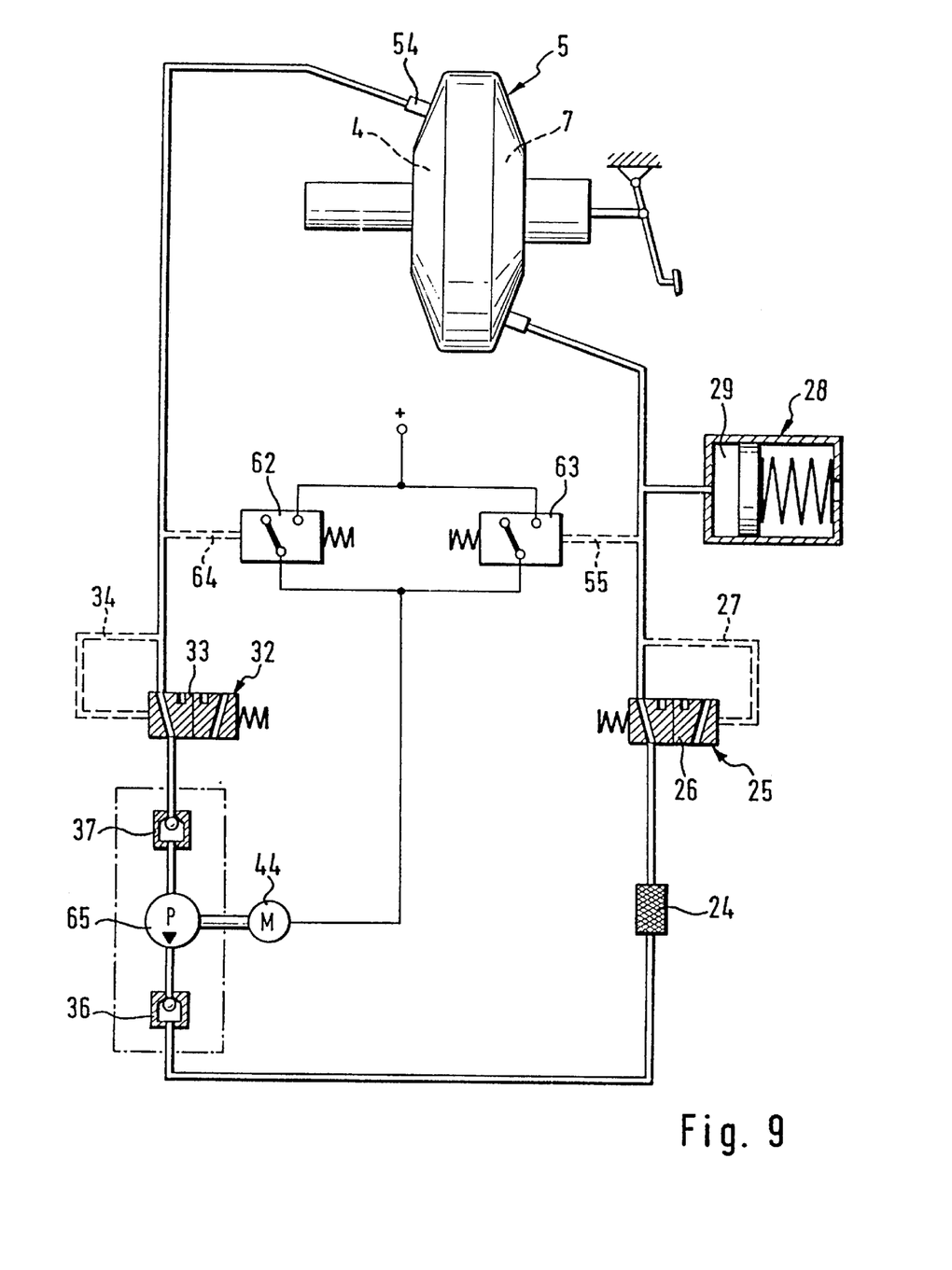
FIG. 9 is a schematic view of the brake system including an electronically driven vacuum/excess pressure pump according to the present invention.

FIG. 9 shows a brake system including an electromotively driven vacuum/excess pressure pump 65 according to the present invention. The pressure side of the excess pressure pump 65 is connected to the high pressure chamber 7 of a brake power booster 5 and the pressure chamber 29 of a pressure accumulator 28 by way of a non-return valve 36, an air dryer 24 and a valve assembly 25. The valve assembly 25 includes a pneumatically operable, preloaded three-way/two-position directional control valve 26 which establishes the mentioned connection in its first switch position (initial position). Valve assembly 25 connects the vacuum/excess pressure pump 65 to the atmosphere in its second switch position which it adopts when a defined pressure value in the pressure chamber 29 is exceeded. The suction side of the vacuum/excess pressure pump 65 is connected to the low pressure chamber 4 of the brake power booster 5 by way of a non-return valve 37 and a valve assembly 32. The valve assembly 32 is configured as a three-way/two-position directional control valve 33 which establishes the mentioned connection in its first switch position and connects the suction side of the pump to the atmosphere in its second switch position which it adopts when a defined pressure in the chamber 4 falls short of.

The electric motor 44 driving the vacuum/excess pressure pump 65 is connected to the current supply by way of two parallel connected pressure switches 62,63. The connection is provided by way of the switch 62 when the pressure in the low pressure chamber 4 exceeds a defined maximum value. The pressure switch 62 is connected to the vacuum port 54, i.e. to chamber 4, by way of a control line 64. The pressure switch 63 is connected to the high pressure chamber 7 of the brake power booster 5 by way of the control line 55 and provides a connection to the current supply when the pressure prevailing in the chamber 7 drops below a defined pressure value. The pressure switches 62 and 63 are electrically parallel connected so that the electric motor 44 is activated as soon as the pressure in the low pressure chamber 4 becomes too high or the pressure prevailing in the high pressure chamber 7 becomes too low. The energy consumption is minimized by way of the valve assemblies 25 and 32 whose function (idle motion or partial idle motion of the pump) has been described with respect to the preceding Figures.

We claim:

1. A brake system for automotive vehicles comprising:
   a pneumatic brake power booster having a low pressure chamber adapted to be acted upon by a low pressure and a high pressure chamber adapted to be acted upon by a pressure higher than that in the low pressure chamber;
   a pneumatic pump connected to at least one of the chambers;
   means for activating and deactivating the pump in response to a pressure prevailing in the at least one of the chambers to which the pneumatic pump is connected;
   a slip control system; and
   an electric motor drivingly connected with the pneumatic pump also drivingly connected with a hydraulic pump associated with the slip control system.

2. A brake system as claimed in claim 1 wherein the means for activating and deactivating the pneumatic pump includes a sensor sensing the power input of the electric motor.

3. A brake system as claimed in claim 1 wherein the pump is configured as an excess pressure pneumatic pump having a pressure side connected to the high pressure chamber and having a suction side connected to the low pressure chamber by way of a valve assembly responsive to the pressure in the low pressure chamber.

4. A brake system as claimed in claim 3 wherein the valve assembly connects the suction side of the excess pressure pump to the low pressure chamber in a first switch position and to the atmosphere in a second switch position.

5. A brake system as claimed in claim 1 wherein the pneumatic pump is configured as a vacuum/excess pressure pneumatic pump and the pneumatic pump is connected on a suction side with the low pressure chamber and the pneumatic pump is connected on a pressure side with the high pressure chamber and each chamber is associated with a respective pressure switch which is responsive to the pressure in the associated chamber and the switches being electrically connected in parallel with each other, and a first valve assembly responsive to pressure in the low pressure chamber disposed between the suction side of the pneumatic pump and the low pressure chamber connects the suction side of the pneumatic pump with the low pressure chamber in a first position and with atmosphere in a second switch position and a second valve assembly responsive to pressure in the high pressure chamber disposed between the pressure side of the pneumatic pump and the high pressure chamber connects the pressure side of the pneumatic pump with the high pressure chamber in a first position and with atmosphere in a second switch position.

6. A brake system as claimed in claim 1 wherein a pressure accumulator is connected to one of the low pressure chamber and the high pressure chamber.

7. A brake system as claimed in claim 1 wherein the pneumatic pump and the hydraulic pump are mounted on the opposite ends of the motor shaft of the motor.

8. A brake system as claimed in claim 1 wherein means for activating and deactivating the pneumatic pump in regular intervals is provided.

9. A brake system as claimed in claim 8 wherein the mean for activating and deactivating the pneumatic pump is a brake light switch.

10. A brake system for automotive vehicles comprising:
    a pneumatic brake power booster having a low pressure chamber adapted to be acted upon by a low pressure and having a high pressure chamber adapted to be acted upon by a pressure higher than the low pressure;
    a pneumatic pump connected to the low pressure chamber on a suction side and to the high pressure chamber on a pressure side;
    means for activating and deactivating the pump in response to a pressure prevailing in the at least one of the chambers to which the pneumatic pump is connected, the means including a pressure responsive valve disposed between at least one of the chambers and the pump; and a motor drivingly connected with the pneumatic pump.

11. A brake system for automotive vehicles as claimed in claim 10 wherein the pump is driven by an electric motor.

12. A brake system for automotive vehicles as claimed in claim 11 wherein the means for activating and deactivating the pump is a pressure responsive switch.

13. A brake system for automotive vehicles as claimed in claim 10 wherein the means for activating and deactivating the pump is a sensor of power input to the electric motor.

14. A brake system for automotive vehicles as claimed in claim 10 wherein the valve connects the suction side of the pneumatic pump to the low pressure chamber in a first switch position and to the atmosphere in a second switch position.

* * * * *